Sept. 4, 1956 J. R. PIERCE 2,761,915
HELIX COUPLERS
Filed Feb. 8, 1952 3 Sheets-Sheet 1

INVENTOR
J. R. PIERCE
BY
Hugh S. Wertz
ATTORNEY

Sept. 4, 1956  J. R. PIERCE  2,761,915
HELIX COUPLERS

Filed Feb. 8, 1952  3 Sheets-Sheet 2

INVENTOR
*J. R. PIERCE*
BY
*Hugh S. Wertz*
ATTORNEY

Sept. 4, 1956     J. R. PIERCE     2,761,915
HELIX COUPLERS

Filed Feb. 8, 1952     3 Sheets-Sheet 3

INVENTOR
J. R. PIERCE
BY
Hugh S. Werty
ATTORNEY

United States Patent Office 2,761,915
Patented Sept. 4, 1956

2,761,915
HELIX COUPLERS

John R. Pierce, Berkeley Heights, N. J., assignor to Bell Telephone Laboratories, Incorporated, New York, N. Y., a corporation of New York Application February 8, 1952, Serial No. 270,721

11 Claims. (Cl. 179—171)

This invention relates to microwave transducers and more particularly to arrangements for energy transfers between helix wave transmission circuits, for example, of the kind characteristic of helix-type traveling wave tubes, and alternative forms of wave transmission circuits, such as hollow wave guides or coaxial cables.

For purposes of illustration, it will be convenient to discuss the present invention with particular reference to energy transfers to and from the wave circuits of helix-type traveling wave tubes, although the applicability of the principles of the present invention to analogous arrangements is not intended to be precluded thereby. In such traveling wave tubes, an electric wave circuit comprising an elongated helical conductor propagates radio frequency signal waves therethrough at axial velocities slower than the velocity of light and an electron stream is projected in the direction of wave propagation through the electric field set up by the electric wave circuit. By proper adjustment of the relative velocities of the propagated wave and the electron stream, the wave and the stream can be made to interact in a cumulative fashion whereby amplification of the wave is realized. In such tubes, it is important to secure over the broad frequency range in which the tube operates accurate impedance matches between the helix wave circuit and the signal input and output circuits which are coupled in energy exchange relationship thereto for introducing input signals and deriving amplified outputs, respectively. If mismatches are here present, components of the radio frequency waves tend to be reflected back and forth along the helix wave circuit. Such components generally make for signal degradation and, in some cases, may result in tube instability. Additionally, for efficiency of operation, it is important that the coupling provided between the helix circuit and the input and output circuits be high and substantially uniform over the entire operating frequency range.

It was soon discovered that simply shunting each end of the helix circuit across a hollow wave guide continuation of the wave transmission system resulted in too weak and narrow-band coupling between the helix circuit and the hollow wave guide. Accordingly, for some time hitherto, the customary expedient has been to taper the helix towards each end and to support each tapered end from a conductive post extending within a hollow wave guide continuation of the wave transmission system. Although it is possible to achieve a good broad band match in this way, such an arrangement is usually characterized by several disadvantages. Most importantly, it is often difficult to make an accurate and reproduceable taper, particularly for operation at very short wavelengths, for example, a few millimeters. Accordingly, some variation from one tube to another results. From a long term operating standpoint, this can be a serious obstacle in complex systems, since it complicates the replacement problem. A second objection to such a taper, which is sometimes significant, is that the supporting conductive post and taper are expensive of tube length, taking up a significant distance so that for given useful length of helix the tube and particularly the magnetic field are made longer. This increases the focusing problems, necessitating stronger magnetic fields which require bulkier solenoids or heavier permanent magnets. Further, it is found that at the output end the taper sometimes results in reduced efficiencies, while at the input end the taper introduces some uncertainty in calculations concerning noise figure, thereby enhancing the difficulty in design of a low noise tube.

Accordingly, the primary object of the present invention is to provide an improved arrangement for inserting a helix wave circuit in a wave transmission system.

In accordance with the present invention, the helix is positioned in energy exchange relationship with a suitable form of wave transmission circuit; the electric field coupling between the helix and the wave transmission circuit is confined to a portion of helix shorter than one half a wavelength of the operating frequency; and an impedance transforming section is utilized for reducing the helix impedance at the coupling portion. In particular, it is in accordance with the invention to modify the characteristic impedance of an odd number of quarter wavelengths of the portion of the helix immediately following the coupling portion without modifying its pitch to make of it a quarter wave impedance transformer between the wave transmission circuit and the rest of the helix. In a preferred embodiment, the desired characteristic impedance can be achieved for the transformer portion of the helix by closely surrounding it with a conductive element.

The invention will be better understood from the following more detailed description taken in connection with the accompanying drawings in which.

Figure 1:
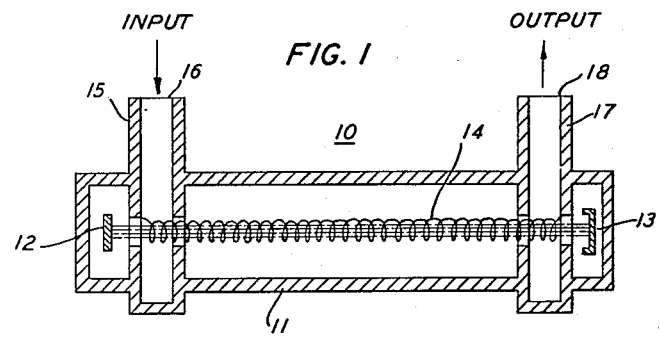
Fig. 1 shows schematically a typical helix-type traveling wave tube suitable for incorporation therein of microwave transducers in accordance with the invention.

With reference now to the drawings, in Fig. 1 there is shown a typical helix-type traveling wave tube 10 of the kind to which the present invention has primary application. Within an evacuated envelope 11, which, for example, is of a non-magnetic metal such as copper, an electron source 12 and a collector electrode 13 in target relationship define a path of electron flow. Along this path there extends an elongated helical conductor 14 which serves as a wave guiding circuit for propagation of electromagnetic waves supplied as an input thereto for interaction with the electron stream. Various arrangements are known for supporting the helix 14 in the path of electron flow. The usual technique is to support the helix by dielectric rods spaced around the outer periphery of the helix and extending therealong. However, in these and subsequent figures the supporting members have been omitted in the interest of simplicity, but it is to be understood that some support for the helix is contemplated. Input signal waves are applied to the helix by way of an input wave guiding circuit 15, which for example, is here shown as a conductively bounded wave guiding passage of the kind generally designated by workers in the microwave art as a hollow wave guide, integral with the metallic envelope and whose side walls are apertured for passage therethrough both of the electron stream and the helix which is shunted thereacross. This input wave guide is, for example, a continuation, by way of a pressure tight glass window 16, of a hollow wave guide which is part of a wave transmission system. Input waves are applied to have a transverse electric field in which the electric lines of force have components transverse to the axis of the input wave guide and in a direction parallel to the longitudinal direction of electron flow and the axis of the helix. In an analogous fashion, amplified output waves are derived at the opposite end of the helix through an output wave guiding circuit 17, here shown also as a hollow wave guide integral with the tube envelope and a continuation, by way of a pressure tight glass window 18, of a hollow wave guide which is a part of a wave transmission system as the input wave guide 15.

A common alternative construction utilizes an evacuated tubular glass envelope in which case the helix circuit is coupled to external input and output wave guides apertured for passage therethrough of the glass envelope.

In any case, in such tubes it is important for the various reasons discussed above that the coupling between the helix circuit and the input and output wave guiding circuits be both strong and matched over the operating frequency band. There will be described hereinafter novel coupling arrangements which satisfy these requirements.

However, before describing in detail these improved arrangements, it will be helpful for a better understanding of the principles of the invention to describe some of the characteristics of a helix circuit.

First, in a discussion of a helix as a wave transmission circuit, it will be useful to assign an impedance to the helix. Although this can be done in several ways, the most appropriate for use appears to be one defined in terms of current and power. If the helix current is represented as I and the power flow as P, then the helix impedance K is given by $$P = KII^* \qquad (1)$$

$$K = \frac{P}{II^*} \qquad (2)$$

where $I^*$ is the complex conjugate of I. Such a definition for the helix impedance appears appropriate because the field driving the helix will be expressed as a longitudinal electromotive force along the helix and the power transfer will be obtained by integrating the product of this electromotive force and the current, and also because it seems reasonable to believe that when two helix sections of different impedance are joined to one another, the currents are the same at the two sides of the junction.

The impedance of the helix can be expressed in terms of various tube parameters. The wave traveling along it can be presumed to vary with time and distance as $$e^{j\omega t}e^{j\beta z} \qquad (3)$$

where $\omega$ is the radian frequency, $t$ is the time, $z$ is the distance along the axis of the helix, and $\beta$ is the phase constant of the traveling wave defined by $$\beta = \frac{\omega}{v} \qquad (4)$$

where $v$ is the phase velocity. A parameter of importance is the free-space phase constant $\beta_0$ of the wave which is given by $$\beta_0 = \frac{\omega}{c} \qquad (5)$$

where $c$ is the velocity of light in free space. In terms of $\beta$ and $\beta_0$, the radial phase constant $\gamma$ is given by $$\gamma = \sqrt{\beta^2 - \beta_0^2} \qquad (6)$$

Figure 3:
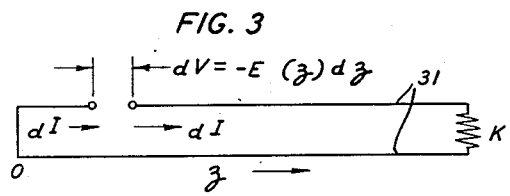
Fig. 3 represents a transmission line circuit equivalent of the electric field coupling between a helix circuit shunted across a hollow wave guide.

In computations of impedance and phase constant, a helically conducting sheet having a pitch angle $\psi$ equal to the pitch angle of the helix and a radius $a$ equal to the mean radius of the helix is taken as an approximate representation of the helix. For given values of $a$, $\psi$ and $\beta_0$, the phase constant $\beta$ and the radial propagation constant $\gamma$ can be obtained by using Figs. 3.2 and 3.3 on pages 24 and 25, respectively, of the book entitled "Traveling Wave Tubes" by J. R. Pierce, published by D. Van Nostrand Co. Inc., New York (1950), to which reference can be made for a more detailed version of this analysis. In this analysis, K is expressed in terms of $\beta$, $\beta_0$, and $\gamma a$, K being given by $$K = \frac{\beta}{\beta_0} G(\gamma a) \qquad (7)$$

where a fair approximation to $G(\gamma a)$ is given by $$G(\gamma a) \doteq \frac{30}{\gamma a} \qquad (8)$$

It may be helpful at this point to develop some relationships for the helix impedance in terms of these various parameters. One important parameter is $\gamma a$. For high performance it is desirable that $\gamma a$ be small. A value of $a$ as low as 1.2 has been used successfully in traveling wave tubes. However, a small value of $a$ means a small helix and in the centimeter and millimeter ranges it may be desirable to make $a$ larger than this value:

First, there can be shown to be an approximate relation between $\gamma a$, $\beta/\beta_0$ and the number of turns per wavelength $n$ as follows:

$$n \simeq \frac{\beta}{\beta_0} \frac{1}{\gamma a} = \frac{c}{v} \frac{1}{\gamma a} \qquad (9)$$

Another parameter of importance is the synchronous voltage, i. e. the voltage which will accelerate an electron to the phase velocity $v$ for the helix. For high gain the operating voltage may be considerably higher than the synchronous voltage. The synchronous voltage V is related to $c/v = \beta/\beta_0$ by $$\frac{c}{v} = \frac{\beta}{\beta_0} = 505 V^{-1/2} \qquad (10)$$

In accordance with the principles of the present invention, it is desirable to use sections of reduced impedance in matching untapered helices to wave guiding circuits. The impedance of a helix can be reduced without changing the pitch, for example, by bringing a conductive circular cylinder close to the helix. If the helix has several turns per wavelength, and if the separation from the conductor is small, the impedance in the presence of the cylinder can be approximated as set forth below with reference to Figs. 2A and 2B.

Figure 2A:
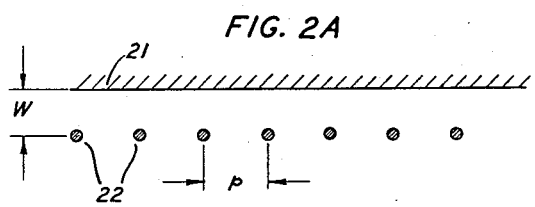
Figs. 2A and 2B are schematic representations useful in the calculation of the impedance of a helix wave circuit.
Figure 2B:
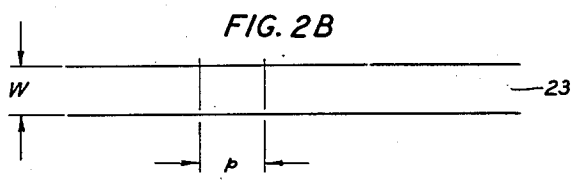

Fig. 2A shows schematically a section of a helix which is closely surrounded by a circular conductive cylinder. Here W is the closest spacing between the cylinder 21 and the helix turns 22 and $p$ is the pitch of the helix and hence the distance between turns. It will be convenient to disregard the phase difference between turns. This will permit a good approximation if there are appreciable turns per wavelength. In this case then, the wire turns and the cylinder can be simulated by the strip line 23 shown in Fig. 2B. In this figure, the strip line is shown looking along the direction of propagation. It can be shown that the impedance K of a strip line of separation W and width $p$ is $$K = 377 \frac{W}{p} \qquad (11)$$

It will then be assumed that the K parameter of Equation 11 is approximately the ratio of the voltage between the helix 22 and cylinder 21 to the helix current, and also that it satisfies approximately Equation 2.

Additionally, there will be utilized the fact that where the helix is close to a conductive cylinder, the velocity of light is a good approximation of the velocity of the wave along the wire helix.

Now that there have been developed some relationships for calculating the impedances of the helix circuits both in free space and when closely surrounded by a cylindrical conductor, it will be useful to include at this point a qualitative analysis of the matching problem. In such an analysis, it is convenient to treat the coupling between the helix and the other wave guiding circuit in accordance with transmission line theory. First there will be analyzed the case in which the helix 14 is shunted across a hollow wave guide 15 as is shown for the tube in Fig. 1. This arrangement can be simulated by the circuit shown in Fig. 3, in which the transmission line 31 represents the helix. The end connected to the wave guide wall is taken as the shorted end of the line at $z=0$. Far to the right, the transmission line or helix is assumed to be terminated in its characteristic impedance K.

At the point $z$ a voltage V defined by $$dV = -E(z)dz \quad (12)$$

where $E(z)$ represents the electromotive force induced in the helix 14 by the wave in the hollow wave guide 15, starts waves to the left and to the right, each wave having a current $$dI = \frac{dV}{2K} = -\frac{E(z)dz}{2K} \quad (13)$$

At $z=0$ the current traveling to the left is reflected without change in sign of current, and it returns to $z$ after a total phase change of $-2\beta z$. Thus, the current set up by the electromotive force in the interval $dz$ at $z$ and traveling to the right is $$dI = -\frac{E(z)dz}{2K}(1+e^{-i2\beta z}) \quad (14)$$

Suppose that for $z>L$, $E(z)=0$. Then at $z=L$ $$I = -\frac{1}{2K}\int_0^L (1+e^{-i2\beta z})e^{-i\beta(L-z)}E(z)dz \quad (15)$$

$$I = -\frac{e^{-i\beta L}}{K}\int_0^L E(z)\cos\beta z\, dz \quad (16)$$

Now let $$V = \int_0^L E(z)dz \quad (17)$$

Thus, V is the voltage across the hollow wave guide 15. It can then be seen that $$|I| < \frac{V}{K} \quad (18)$$

If the field $E(z)$ extends over several or many radians, $|I|$ may be much smaller than $V/K$.

The power into the helix, $P_n$ is $$P_n = |I|^2 K \quad (19)$$

If the helix is coupled to the hollow wave guide so that it terminates the wave guide in its characteristic impedance, then this same power must be the power flowing into the wave guide which is $V^2/K_W$ where $K_W$ is the wave guide impedance on a voltage-power basis. Thus, for a match $$|I|^2 K = V^2/K_W \quad (20)$$

By means of relationship (18) it can be seen that for a match $$\frac{K_W}{K} > 1 \quad (21)$$

Further, if $E(z)$ extends over several radians, the wave guide impedance $K_W$ must be considerably greater than the helix impedance K in order to attain a match.

The characteristic impedance $K_W$ of the conventional rectangular wave guide on a voltage power basis is $$K_W = \frac{2b}{a}\frac{377}{\sqrt{1-(\lambda/\lambda_0)^2}} \quad (22)$$

where $b$ is the height of the wave guide, $a$ is the width of the wave guide, $\lambda_0$ is the cut-off wavelength and $\lambda$ is the free space wavelength.

Typically $a = 2b$
$\lambda = \frac{3}{4}\lambda_0$
$K_W = 580$

On the other hand, the helix impedance which can be calculated from Equation 7 is found to vary for synchronous voltages below 1000 volts from values below and above this value of wave guide impedance, increasing for decreasing synchronous voltages and also for decreasing values of the parameter $\gamma a$.

Figure 4:
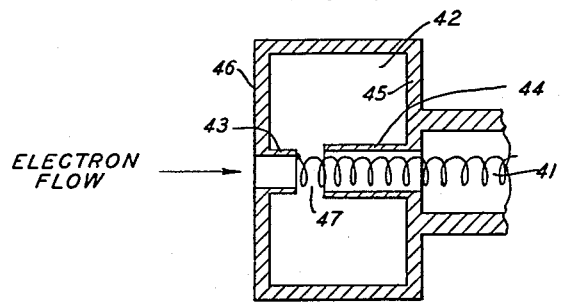
Figs. 4 through 9 show various illustrative embodiments of helix-to-hollow wave guide transducers in accordance with the invention.

This analysis shows that, in some cases, when the helix impedance is less than the wave guide impedance, it is possible to match an untapered helix to a hollow wave guide merely by providing some means for confining the wave guide field $E(z)$ to a distance along the helix which is a small number of radians. Such an arrangement is shown in Fig. 4. Here the helix 41 extends through an aperture in side wall 45 of the hollow wave guide 42, which is here shown as rectangular, extending in a direction normal to the plane of the paper and supplied with electromagnetic waves which provide a transverse electric field, i. e., $TE_{0,1}$ waves. The helix 41 is supported at one end by the hollow conductive post 43 which projects from the opposite guide side wall 46. A hollow conductive cylindrical collar 44 extends from guide side wall 45 along and closely surrounding a portion of the helix 41 in the interior of the wave guide for confining the field coupling between the wave guide and helix to the gap 47 which is a small number of radians of the helix. However, in this case, by confining the wave guide field to the short gap 47, a capacitance is introduced across the wave guide 42 in shunt with the rather high wave guide impedance, and some narrowing of the pass band is thereby effected.

The alternative used in the past of tapering the end of a helix and mounting it on a post does permit some improvement in these respects. However, this expedient has the various objections described above.

In accordance with the present invention, matching is effected without tapering by transforming the helix impedance to a relatively low value and confining the coupling to the helix to a few radians of helix turns less than one half a wavelength.

Figure 5:
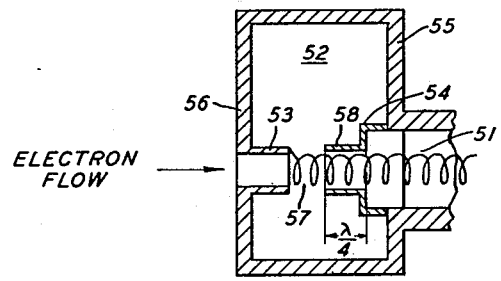

Fig. 5 shows an illustrative coupling arrangement of this sort. Here, as in the arrangement of Fig. 4, a helix 51 extends through an aperture in a side wall of a hollow rectangular wave guide 52 and is supported at one end by a conductive post 53 projecting from the opposite side wall 56. Also there extends from side wall 55 a hollow conductive cylindrical collar 54 for confining the field coupling along the helix to a short gap 57 which is less than a half helix wavelength. Additionally, in accordance with another feature of the invention, the conductive collar 54 acts as an impedance transforming means for reducing the helix impedance at the gap 57 to a relatively low value. To this end, the collar 54 includes a section 58 which closely surrounds the helix, for example, for the quarter wavelength portion thereof immediately following the gap 57 for forming of this helix portion a quarter wave impedance transformer. Consequently, although the field coupling will be limited to only the short gap 57, a relatively low impedance will be provided across that gap and hence capacitive loading will not seriously limit the bandwidth as in the previous case described. Additionally, it may be advantageous to support the helix 51 in the wave guide 52 so as to position the gap 57 off-center in a cross section of the wave guide and thereby to provide a better match between its low impedance and the higher wave guide impedance.

In this arrangement, the conductive member 54 serves the dual function of confining the field coupling between the helix and the wave guide to the short gap 57 and of reducing the helix impedance at this gap. It is, of course, feasible to utilize separate elements for each function. Additionally, it is consistent with the invention to utilize some other form of impedance transforming means for reducing the helix impedance at the gap, as for example by the insertion inside the helix of a conductive rod an integral odd number of quarter wavelengths long.

Figure 6:
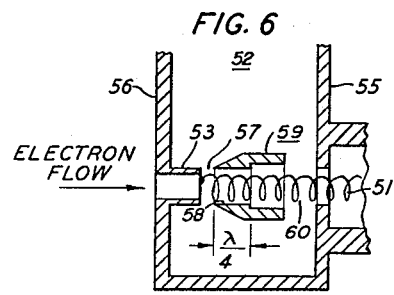

It has also been found that efficient coupling can be realized by modifications of this basic arrangement. Fig. 6, for example, shows an embodiment which additionally utilizes means in the wave guide for increasing the strength of the wave guide field in the region of the coupling portion of the helix. In the interest of simplicity, elements corresponding to those of the basic arrangement shown in Fig. 5 will be designated by the same reference numbers. In this case, there is provided in the wave guide 52 a conductive member 59 which acts both to confine the field coupling to the helix and to focus the wave guide field on the coupling gap 57. Additionally, to secure the impedance transforming effect, the member 59 is provided with a section 58 which, as before, closely surrounds the helix for a quarter wavelength for reducing the helix impedance at the gap 57. The member 59 is dimensioned and positioned so that substantially all the energy incident in the wave guide acts to propagate a wave in the helix 51 in the direction of electron flow. Substantially all the electric coupling between the wave guide and the helix takes place in gap 57, since the exposed portion 60 is unimportant from a coupling standpoint, being made too long for the wave-guide field to have appreciable effect, and serves merely to take up the excess between the top of member 59 and the wave guide side wall 55. It may be also advantageous to locate the gap 57 off center in the wave guide as above. By starting the helix from the top of the conducting post 53, there is minimized the capacitance from the member 59 to the wave guide 52.

Figure 7:
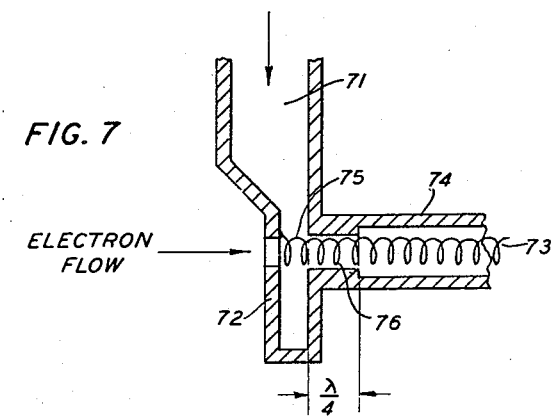

Fig. 7 shows an alternative embodiment of the basic arrangement described previously. In this case, the wave guide 71, which is here shown as extending in the plane of the paper, is tapered at the end to a thin low-impedance section 72. The helix 73 extends through an aperture in one wall of the low-impedance section 72 and is supported at its end from the opposite side wall. Intermediate between the wave guide 72 and the elongated portion of the tube envelope, the envelope closely surrounds the helix 73 along a quarter wavelength section 76 thereof to serve as an impedance transforming section for reducing the helix impedance at the gap 75, which is a small number of radians, and where is provided the electric coupling between the helix and the wave guide.

Figure 11:
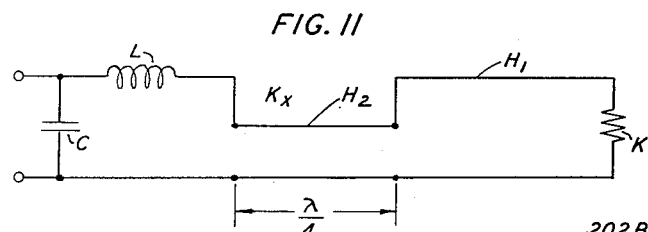
Figs. 11 and 12 represent transmission line circuit equivalents of the types of microwave transducer shown in Fig. 5 and Fig. 9, respectively.

Fig. 11 shows the equivalent circuit, including the gap capacitance, of the basic arrangement shown in Fig. 5. The transmission line $H_1$ represents the helix 51 of impedance K and terminated in its characteristic impedance at the far end. The transmission section $H_2$ represents the helix section surrounded by the conducting cylinder 54 for a distance of one quarter of a wavelength so as to have a reduced impedance $K_x$. The lumped inductive element L represents the inductance of the portion of the helix which forms the gap 57 and lumped capacitive element C the capacitance of this gap. It can be seen that effectively the impedance of the coupling gap, which will be low, may be treated as in series with the impedance of the wave transmission element in the design of a suitable quarter-wave transformer.

Use of this equivalent circuit, after the various parameters involved are determined for a specific matching problem, should make the design of helix-waveguide or helix-coaxial transducers a straightforward circuit problem. The general design principles of quarter wave impedance transformers are set forth in the "Radio Engineers Handbook" by F. E. Terman on pages 186 through 188, first edition (1943) published by McGraw-Hill Book Company, Inc., New York. It is there set forth that an impedance match between two transmission lines of impedance $Z_s$ and $Z_1$, respectively, can be effected by insertion of a transmission line of length of an odd number of quarter wavelengths of characteristic impedance $Z_0$ when $$Z_0^2 = Z_s Z_1$$

Consideration of helix-to-wave guide and helix-to-coaxial transducers in the light of transmission line theory, in accordance with the principles of the invention, suggests various other arrangements.

Figure 8:
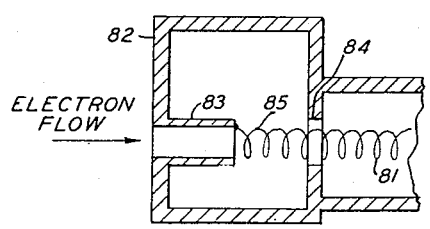

Fig. 8 shows an arrangement in which there is utilized a short cylinder 84 surrounding the helix 81 to produce effectively a lumped capacitance $C_1$ rather than a quarter-wave matching section for reducing the helix impedance at the coupling gap. In other respects, this arrangement resembles the basic arrangement of Fig. 5, and includes a helix 81, which extends through a side wall of a hollow wave guide 82 and has one end supported from a conducting post 83 which projects from an opposite wall of the wave guide 82. Here the field coupling between the helix and wave guide is confined to a short portion 85 of the helix.

Figure 12:
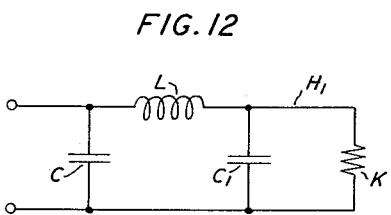

In this case, the equivalent circuit will be as shown in Fig. 12 in which the transmission line $H_1$ represents the helix terminated in its characteristic impedance K, the lumped inductive element L the inductance of the portion of the helix extending across gap 85, the capacitive element C the gap impedance, and the capacitive element $C_1$ the shunt impedance of the conducting cylinder 84.

Figure 9:
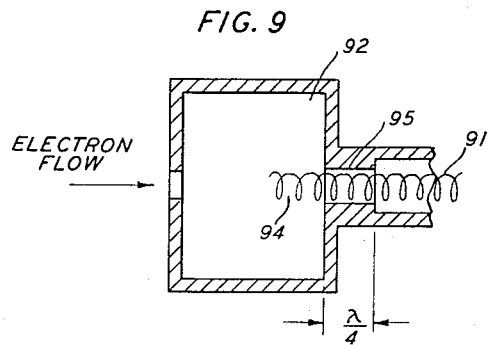

Still another possible embodiment is shown in Fig. 9. In this case, the basic arrangement of Fig. 5 is modified, as shown, by extending the helix 91, open circuited at the end, into the wave guide 92, exposing a short gap 94 for coupling the helix and wave guide. Beyond the gap 94, the helix is surrounded for a quarter wave by the impedance transforming section 95 as in previously described arrangements.

Figure 10B:
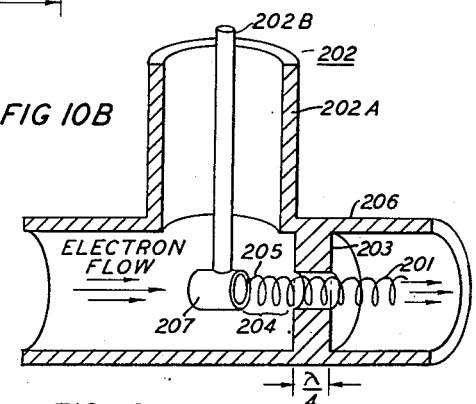
Figs. 10A and 10B show illustrative embodiments of helix-to-coaxial cable transducers in accordance with the invention.
Figure 10A:
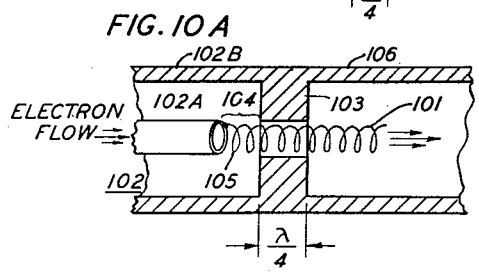

Figs. 10A and 10B show, by way of example, how the principles of the invention can be applied to helix-to-coaxial transducers which are coaxial analogues of the arrangement shown in Fig. 5. In the transducer of Fig. 10A, the helical conductor 101 is in energy exchange relation with the coaxial line 102 which comprises an inner cylindrical conductor 102A enclosed by an outer cylindrical conductor 102B. The inner conductor 102A may be solid or, as is advantageous for the traveling wave tube application shown, tubular for passage of electron flow therethrough. The helix 101 is positioned to be in field coupling relation with the coaxial line 102 along a short end portion 105 thereof less than half an operating wavelength.

In this arrangement, the helix is supported from the inner conductor 102A, coaxial therewith, and extends longitudinally in the direction of electron flow. For confining the field coupling to the end portion 105 of the helix, the outer conductor 102B is extended beyond the end of the inner conductor 102A and provided with lateral projection 103 towards the helix for forming the coupling gap 104 between the inner conductor 102A and the projection 103 wherein the electric lines of force in the coaxial cable are parallel to the axis of helix. Additionally, in accordance with the invention, the projection 103 closely surrounds the helix along a quarter wavelength for reducing the helix impedance at the end portion 105 in the coupling gap 104. The outer conductor 102B can also be made integral with the envelope 106 which surrounds the electron flow.

In the alternative arrangement of Fig. 10B, the coaxial line 202 extends normal to the path of electron flow and the helical conductor 201. A hollow cylindrical conductive cap 207 is integral with the end of the inner conductor 202B and therefrom is supported the helix 201. The electron flow passes through the hollow cap 207 and along the axis of the helix. To confine the field coupling to a short end portion 205 of helix, as before the outer conductor 202A is made integral with the envelope 206 surrounding the helix and a lateral projection 203 from the envelope forms a coupling gap 204 with the inner conductor within which the electric lines of force of the coaxial line are parallel to the helix axis. Moreover, again the projection 203 serves a dual role, surrounding closely a quarter wave section to reduce the helix impedance at the end portion 205 within the coupling gap 204.

It should be evident that, in coaxial line transducers of this kind, it is equally feasible to uitilize extensions of, or projections from, the inner conductor for forming a coupling gap with the outer conductor and arrangements can be devised in which even the impedance transforming section is integral with the inner conductor.

Traveling wave tubes of this kind which employ coaxial lines for energy transfers to and from a helix wave circuit are described in more detail in copending applications of G. H. Robertson Serial No. 270,598, filed February 8, 1952, and of G. H. Robertson and E. J. Walsh Serial No. 270,599, filed February 8, 1952.

It is to be understood therefore that the various embodiments which have been described specifically are merely illustrative of the general principles of the invention. Various other arrangements can be devised by one skilled in the art without departing from the spirit and scope of the invention.

What is claimed is:

1. A microwave transmission circuit including a transducer comprising a first wave guiding circuit, a helix in field coupling relationship to said first wave guiding circuit, said coupling relationship being confined to a short end portion including a plurality of radians of helix turns of uniform pitch and impedance transforming means comprising a length of conductor extending substantially parallel to and in proximate spaced relationship to a portion of said helix immediately adjacent to said end portion for reducing the helix impedance at said end portion.

2. A transmission circuit according to claim 1 in which the first wave guiding circuit is a hollow wave guide.

3. A transmission circuit according to claim 1 in which the first wave guiding circuit is a hollow wave guide which is tapered to confine the coupling relationship to the said end portion of the helix.

4. A transmission circuit according to claim 1 in which the first wave guiding circuit is a coaxial line.

5. A transmission circuit according to claim 1 in which the coupling relationship is confined to a portion of the helix less than one-half wavelength long.

6. A transmission circuit according to claim 1 in which the length of the portion of the helix along which the impedance transforming conductor extends is a quarter wavelength.

7. A transmission circuit according to claim 1 in which the length of the portion of the helix along which the impedance transforming conductor extends is an odd integral number of quarter wavelengths.

8. A transmission circuit according to claim 1 in which the helix is positioned along the path of an electron stream in energy exchange relation therewith.

9. In a microwave transducer, a hollow wave guide, a conducting post projecting into said wave guide from a side wall thereof, a uniform-pitch helix extending into said wave guide and connected at an end thereof to said conducting post, conducting means in said wave guide and surrounding said helix for confining the field coupling between the helix and wave guide to the end portion of the helix, and impedance transforming means comprising a length of conductor extending substantially parallel to and closely surrounding the helix for a quarter wavelength immediately following said end portion for reducing the helix impedance at said end portion.

10. In a microwave device, an electron source and collector electrode defining a path for an electron stream, a helix for propagating electromagnetic waves along said path for interaction with the electron stream, and energy transfer means in energy exchange relationship with said helix comprising a hollow wave guide apertured for admittance of the helix and traversal of the electron stream, conducting means in said wave guide for confining the field coupling between the wave guide and the helix to a portion of helix less than one-half a wavelength long, and impedance transforming means comprising a length of conductor extending substantially parallel to and in proximate spaced relationship to a portion of said helix immediately following said coupling portion for reducing the helix impedance at said coupling portion.

11. In a wave transducer, a hollow wave guide, a conductive post extending inward from one wall of said guide, a conductive helix extending through an aperture in another wall of said wave guide and connected at one end to said conductive post, and a conductive member extending from the apertured wall of said wave guide and including a ring portion which extends along parallel to and closely surrounds a portion of said helix in said wave guide for reducing the impedance of the helix seen by the wave guide.

References Cited in the file of this patent

UNITED STATES PATENTS

| | | |
|---|---|---|
| 2,408,032 | Beck | Sept. 24, 1946 |
| 2,526,846 | Bowman | Oct. 24, 1950 |
| 2,572,672 | Smith | Oct. 23, 1951 |
| 2,578,434 | Lindenblad | Dec. 11, 1951 |
| 2,602,148 | Pierce | July 1, 1952 |
| 2,603,772 | Field | July 15, 1952 |
| 2,611,102 | Bohlke | Sept. 16, 1952 |
| 2,637,775 | Lund | May 6, 1953 |

OTHER REFERENCES

Article by Kompfner, "The Traveling-Wave Tube as Amplifier at Microwaves," Proceedings of the I. R. E., February 1947, pages 124–127.